(12) United States Patent
Chauhan et al.

(10) Patent No.: US 11,748,755 B2
(45) Date of Patent: Sep. 5, 2023

(54) SECURITY SYSTEM FOR CARDS USING ENVIRONMENTAL ANALYSIS

(71) Applicant: Bank of America Corporation, Charlotte, NC (US)

(72) Inventors: Sandeep Kumar Chauhan, Hyderabad (IN); Jagadish Reddy, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 25 days.

(21) Appl. No.: 17/389,508

(22) Filed: Jul. 30, 2021

(65) Prior Publication Data

US 2023/0034821 A1 Feb. 2, 2023

(51) Int. Cl.
*G06Q 20/34* (2012.01)
*G06Q 20/40* (2012.01)

(52) U.S. Cl.
CPC ....... *G06Q 20/4014* (2013.01); *G06Q 20/341* (2013.01)

(58) Field of Classification Search
CPC .......................... G06Q 20/4014; G06Q 20/341
See application file for complete search history.

(56) References Cited

U.S. PATENT DOCUMENTS

| | | | |
|---|---|---|---|
| 2007/0259717 A1* | 11/2007 | Mattice | G06F 3/0346 463/36 |
| 2013/0024375 A1* | 1/2013 | Choudhuri | G06Q 40/00 705/44 |
| 2017/0323166 A1* | 11/2017 | Colussi | G06K 19/07354 |
| 2019/0080072 A1* | 3/2019 | Van Os | G06F 3/016 |
| 2021/0374391 A1* | 12/2021 | Jorasch | G06V 40/10 |

* cited by examiner

*Primary Examiner* — Bruce I Ebersman
*Assistant Examiner* — Matthew Cobb
(74) *Attorney, Agent, or Firm* — Weiss & Arons LLP

(57) ABSTRACT

Apparatus and methods for securing a transaction. The apparatus may include a transaction instrument. The transaction instrument may be configured to exchange transaction data to effect a transaction by engagement of a microprocessor with a transacting party. The transaction instrument may include a sensor. The sensor may be configured to sense an environmental parameter. The sensor may be in electrical communication with the microprocessor. The apparatus may run analysis using a distributed model. In the distributed model, heavy processing may be performed at the pattern registration platform, and light processing may be performed on on-board processors on the transaction instrument. The environmental parameter may be associated with one or more behaviors of the user.

6 Claims, 9 Drawing Sheets

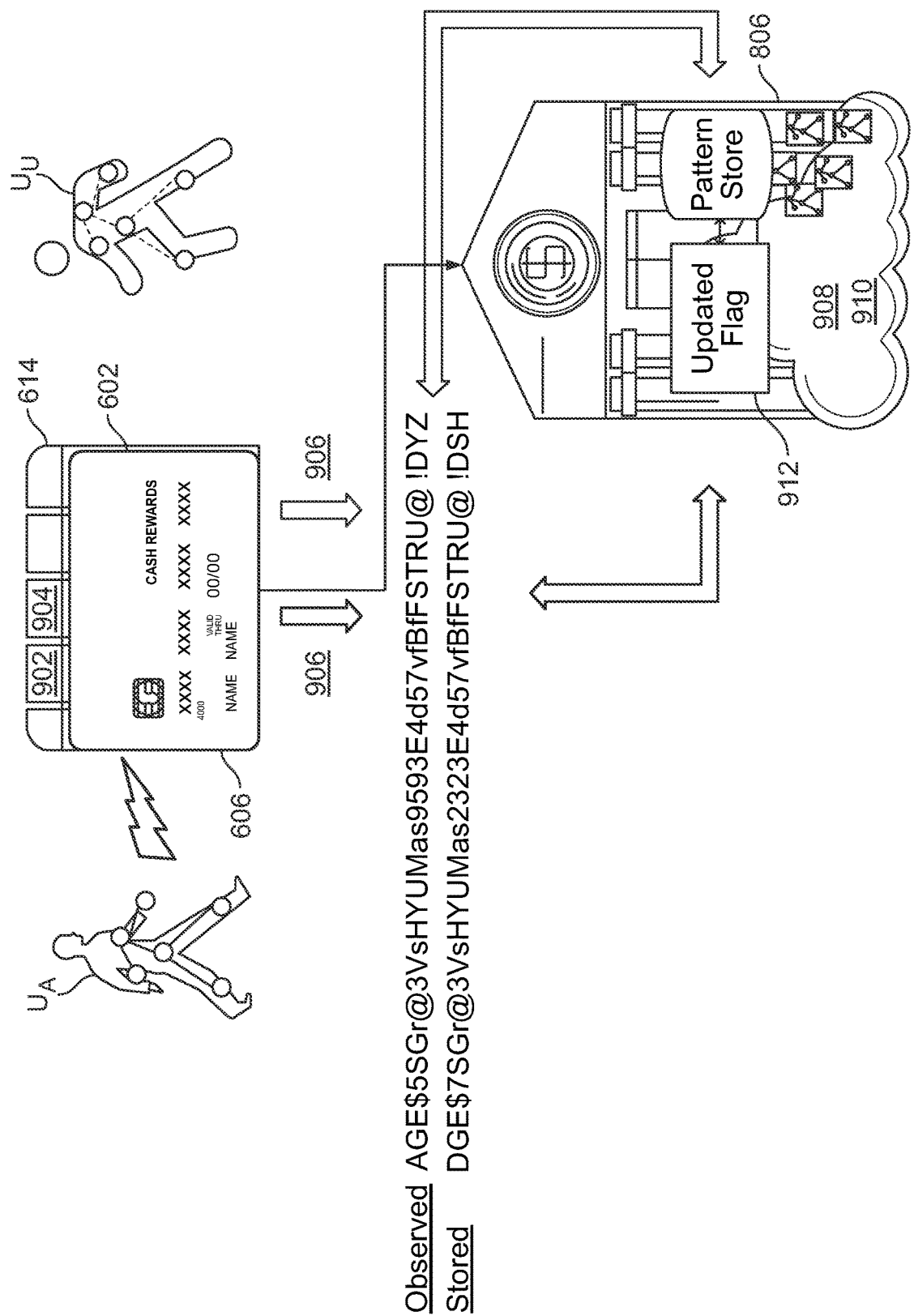

SECURITY SYSTEM FOR CARDS USING ENVIRONMENTAL ANALYSIS

BACKGROUND

Individuals typically use a debit or credit card for executing transactions. When a card is lost, the individual's funds may be subject to fraudulent activity if the card is obtained by an unauthorized person. Typically, a card is not able to sense the identity of a person carrying the card.

It would be desirable, therefore, to provide apparatus and methods for securing a transaction.

SUMMARY

Apparatus and methods for securing a transaction are provided. The apparatus may include a transaction instrument. The transaction instrument may include a first microprocessor. The transaction instrument may include a second microprocessor. The transaction instrument may be configured to exchange transaction data. The transaction data may be exchanged to effect a transaction by engagement of the first microprocessor with a transacting party. The apparatus may include a sensor. The sensor may be mounted on the instrument. The sensor may be configured to sense an environmental parameter. The sensor may be electrical communication with the second microprocessor. The apparatus may run real-time pattern model analysis using a distributed model. In the distributed model, heavy processing may be performed at the pattern registration platform, and light processing may be performed on on-board processors on the transaction instrument.

BRIEF DESCRIPTIONS OF THE DRAWINGS

The objects and advantages of the invention will be apparent upon consideration of the following detailed description, taken in conjunction with the accompanying drawings, in which like reference characters refer to like parts throughout, and in which:

FIG. 10 shows illustrative information and apparatus in accordance with principles of the invention.

Figure 1:
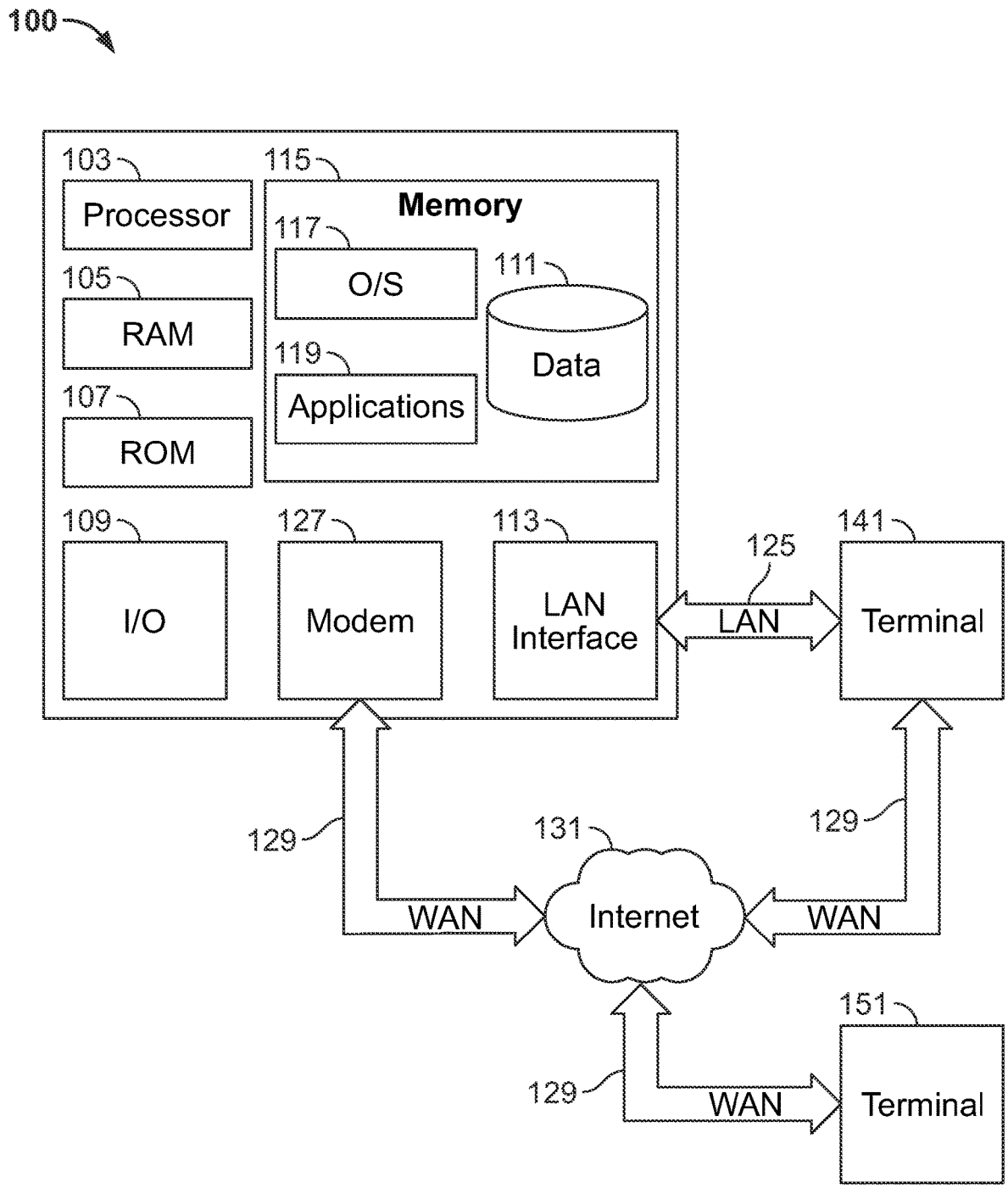
FIG. 1 shows illustrative apparatus in accordance with principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for securing a transaction are provided. The apparatus may include a transaction instrument. The transaction instrument may include one or more microprocessors. The transaction instrument may be configured to exchange transaction data to effect a transaction by engagement of the first microprocessor with a transacting party. The apparatus may include a sensor. The sensor may be configured to sense an environmental parameter. The sensor may be electrical communication with the second microprocessor.

The apparatus may run analysis using a distributed model. In the distributed model, heavy processing may be performed at the pattern registration platform, and light processing may be performed on on-board processors on the transaction instrument.

Table 1 lists illustrative transaction instruments

TABLE 1

| Illustrative transaction instruments |
|---|
| Bank card |
| Smart phone |
| Mobile terminal (incl. wearable mobile terminal) |
| Tablet |
| Other suitable instruments |

Table 2 lists illustrative transaction information.

TABLE 2

| Illustrative transaction information |
|---|
| Transaction instrument identification information (e.g., a card number, a MAC (media access control) address, an IP address) |
| Transaction instrument issuer information (e.g., a bank issuer number ("BIN")) |
| Financial institution account information |
| Financial institution routing identification information |
| Transaction processing network identification information |
| Transaction amount information |
| Electronic Fund Transfer information |
| ACH information |
| Other suitable information |

Table 3 lists illustrative sensor types.

TABLE 3

| Illustrative sensor types |
|---|
| Acceleration sensor |
| Thermal sensor |
| Pressure sensor |
| Light sensor |
| Vibration sensor |
| Other suitable sensor |

Table 4 lists illustrative environmental parameters.

TABLE 4

| Illustrative environmental parameters |
|---|
| Acceleration |
| Thermal |
| Pressure |
| Light |
| Vibration |
| Location (e.g., a global-positioning system coordinate, an elevation, etc.) |
| Other suitable environment parameters |

Environmental quantities may be derived from environmental parameters. For example, speed may be derived from location and time. Body and body part motions may be derived from mass, acceleration and time. Mass of a body or body part may be estimated. The mass may be provided by the user. Elevation may be derived from pressure.

The environmental parameters may be associated with one or more behaviors of the user. lists illustrative behaviors.

Table 5 lists illustrative environmental parameters.

TABLE 5

Illustrative behaviors

Walking
Exercising
Driving
Flying
Working
Other suitable behaviors

The second microprocessor may be configured to derive from the parameter a pattern. The second microprocessor may be configured to encode the pattern in a has that may be referred to as an "observed" hash. The second microprocessor may be configured to initiate an augmented authentication. The transaction may be a transaction that requires an authentication that may be referred to as a "basic" authentication. The basic authentication may be an authentication that is not included in the augmented authentication.

The transaction instrument may be configured to interact with a transaction terminal. The transaction instrument may be configured to exchange transaction information with the transaction terminal. The transaction terminal may include an interface for communication between transacting parties.

Table 6 lists illustrative transaction terminals.

TABLE 6

Illustrative transaction terminals

Point-of-sale ("POS") terminal--fixed
Point-of-sale ("POS") terminal--mobile
Automated transaction machine ("ATM")
Self-check-out device
Other suitable transaction terminals The second microprocessor may be the first microprocessor.

The second microprocessor may be configured to perform a comparison of the observed hash to a stored hash. The second microprocessor may be configured to identify a mis-match between the observed hash and the stored hash. The second microprocessor may be configured to initiate the augmented authentication only because of the mis-match.

The apparatus may include a pattern registration platform. The pattern registration platform may be remote from the instrument. The pattern registration platform may be configured to perform a comparison of the observed hash to a stored hash. The pattern registration platform may be configured to identify a mis-match between the observed hash and the stored hash. The pattern registration platform may be configured to initiate the augmented authentication only because of the mis-match.

The environmental parameter may correspond to motion of the instrument.

The first microprocessor may perform the transaction. The second microprocessor may derive the pattern. A transacting party may communicate to the first microprocessor a request corresponding to the augmented authentication.

Table 7 lists illustrative transacting parties.

TABLE 7

Illustrative transacting parties

Electronic payment platform
Financial institution
Private enterprise (e.g., in the context of a time and attendance platform)
A security party (e.g., in the context of perimeter security, authorization for admission into interior of perimeter
User
Other suitable parties The methods may include a method for securing the transaction.

The methods may include sensing, on a transaction instrument configured to exchange transaction data to effect a transaction, an environmental parameter. The methods may include deriving from the parameter a pattern. The methods may include deriving from a combination of parameters a pattern. The methods may include encoding the pattern in an a hash that may be referred to as an "observed" hash. The methods may include performing a comparison of the observed hash to a stored hash. The methods may include, based on the comparison, initiating an augmented authentication. The transaction may be a transaction that requires an authentication that may be referred to as a "basic" authentication. The basic authentication may be an authentication that is not included in the augmented authentication. The comparison may result in a mis-match between the observed hash and the stored hash. The initiating may be an initiating that occurs only because of the mis-match.

The transaction instrument may execute the performing.

The methods may include transmitting the observed hash to a remote pattern registration platform. The remote pattern registration platform may execute the performing. The augmented authentication may be performed before the basic authentication.

The augmented authentication may be readied prior to the transaction.

The deriving may be a first deriving. The methods may include, after the first deriving, executing a second deriving. The methods may include, after conclusion of the first deriving, executing the second deriving. The methods may include, after conclusion of the first deriving, executing the comparison.

The methods may include setting a time interval between the first deriving and the second deriving. The pattern may be based on a time-series of signals output by a sensor on the instrument. The signals may correspond to a load on the instrument. The load may include a momentum load. The load may include an inertial load. The load may include a thermal load. The load may include a pressure load. The load may include an optical load. The load may include a vibrational load.

The pattern may be based on a transformation of the time-series. The transformation may include a derivative of the time-series. The derivative may be a temporal derivative. The derivative may be a spatial derivative.

The transformation may be based on a relationship between the time series and force, momentum, kinetic energy, thermal energy, or any other suitable quantity.

The methods may include communicating, from a pattern registration platform to a user, over the internet an instruction to perform an act. The methods may include sensing, on a transaction instrument configured to exchange transaction data to effect a transaction, an environmental parameter responsive to the act. The methods may include deriving from the parameter a pattern. The methods may include encoding the pattern in an observed hash. The methods may include transmitting to the platform the observed hash.

The methods may include communicating, from the pattern registration platform to the user, over the internet a supplemental instruction to perform a supplemental act. The methods may include:

(a) sensing, on the transaction instrument, a supplemental environmental parameter responsive to the supplemental act;
(b) deriving from the parameter a supplemental pattern;
(c) encoding the pattern in a supplemental observed hash; and
(d) transmitting to the platform the supplemental observed hash.

The methods may include repeating steps a-d until the platform holds a library that includes the observed hash and the supplemental observed hashes.

FIG. 1 is a block diagram that illustrates a computing server 101 (alternatively referred to herein as a "server or computer") that may be used in accordance with the principles of the invention. The server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of server 101 may provide input, and may also include one or both of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, server 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing server 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to perform the functions of one or more of a transaction instrument, a sensor, or a pattern registration platform, and perform any other suitable tasks.

The apparatus and methods may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The apparatus and methods may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
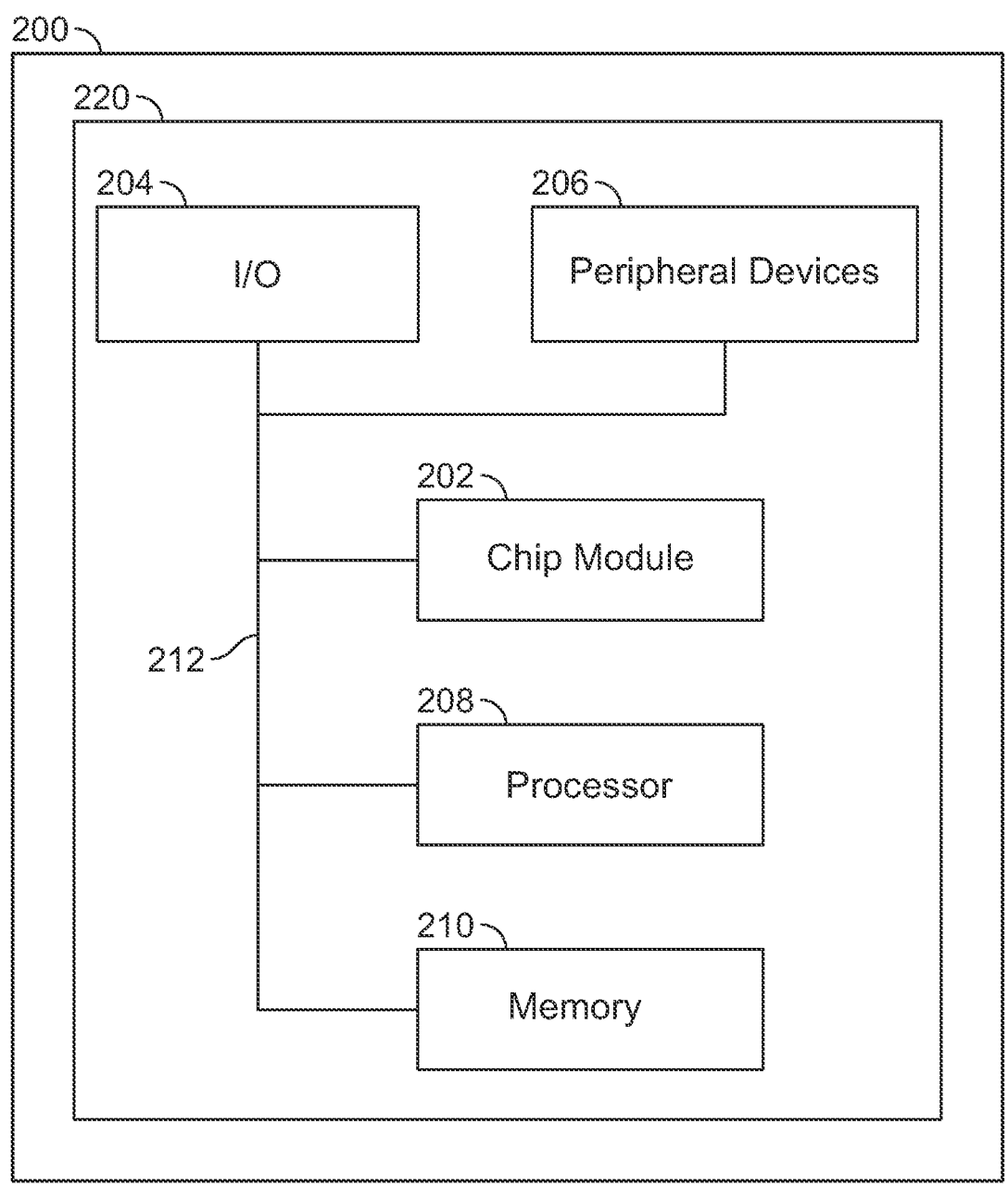
FIG. 2 shows illustrative apparatus in accordance with principles of the invention.

FIG. 2 shows illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may solve equations and perform other methods described herein; and machine-readable memory 210.

Machine-readable memory 210 may be configured to store in machine-readable data structures associated with patterns, pattern hashes, or augmented authorization, and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
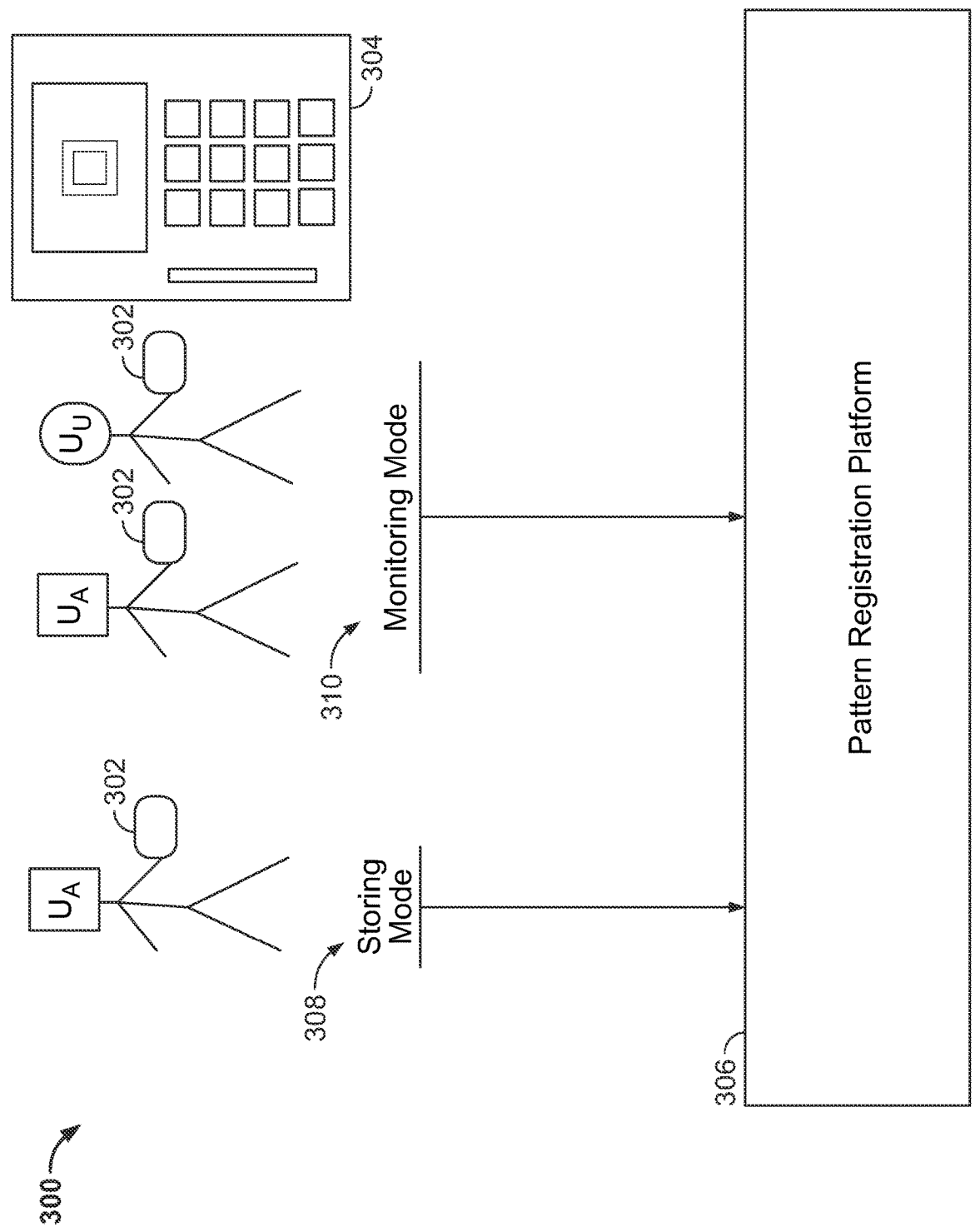
FIG. 3 shows an illustrative architecture in accordance with principles of the invention.

FIG. 3 shows illustrative architecture 300 for securing a transaction. Architecture 300 may include transaction instrument 302. Architecture 300 may include transaction terminal 304. Architecture 300 may include pattern registration platform 306. Architecture 300 may provide storing mode 308. Architecture 300 may provide monitoring mode 308.

In storing mode 308, transaction instrument 302 may transmit, wirelessly or through contact, to pattern registration platform 306, hash values corresponding to patterns generated by behaviors of authorized user UA while authorized user UA is in possession of transaction instrument 302.

The wireless or contact communication may include a mobile terminal intermediate transaction instrument 302 and pattern registration platform 306. The wireless or contact communication may include a non-mobile terminal intermediate transaction instrument 302 and pattern registration platform 306. The non-mobile terminal may include transaction device 304. Transaction instrument 302 may include machine readable memory to store hash values until a communication channel becomes available.

In monitoring mode 310, transaction instrument 302 may transmit, wirelessly or through contact, to pattern registration platform 306, hash values corresponding to patterns generated by behaviors of authorized user UA while authorized user UA is in possession of transaction instrument 302. In monitoring mode 310, transaction instrument 302 may transmit, wirelessly or through contact, to pattern registration platform 306, hash values corresponding to patterns generated by behaviors of unauthorized user Uu while unauthorized user Uu is in possession of transaction instrument 302.

Pattern registration platform 306 may be in communication with transaction device 304. If a user presents transaction instrument 302 to transaction device 304, transaction device 304 may request from pattern registration platform 306 augmented authorization to perform a transaction. If in monitoring mode 310, pattern registration platform 306 detects a pattern that does not correspond to a pattern stored during storing mode 308, pattern registration platform 306 may deny augmented authorization.

Figure 4:
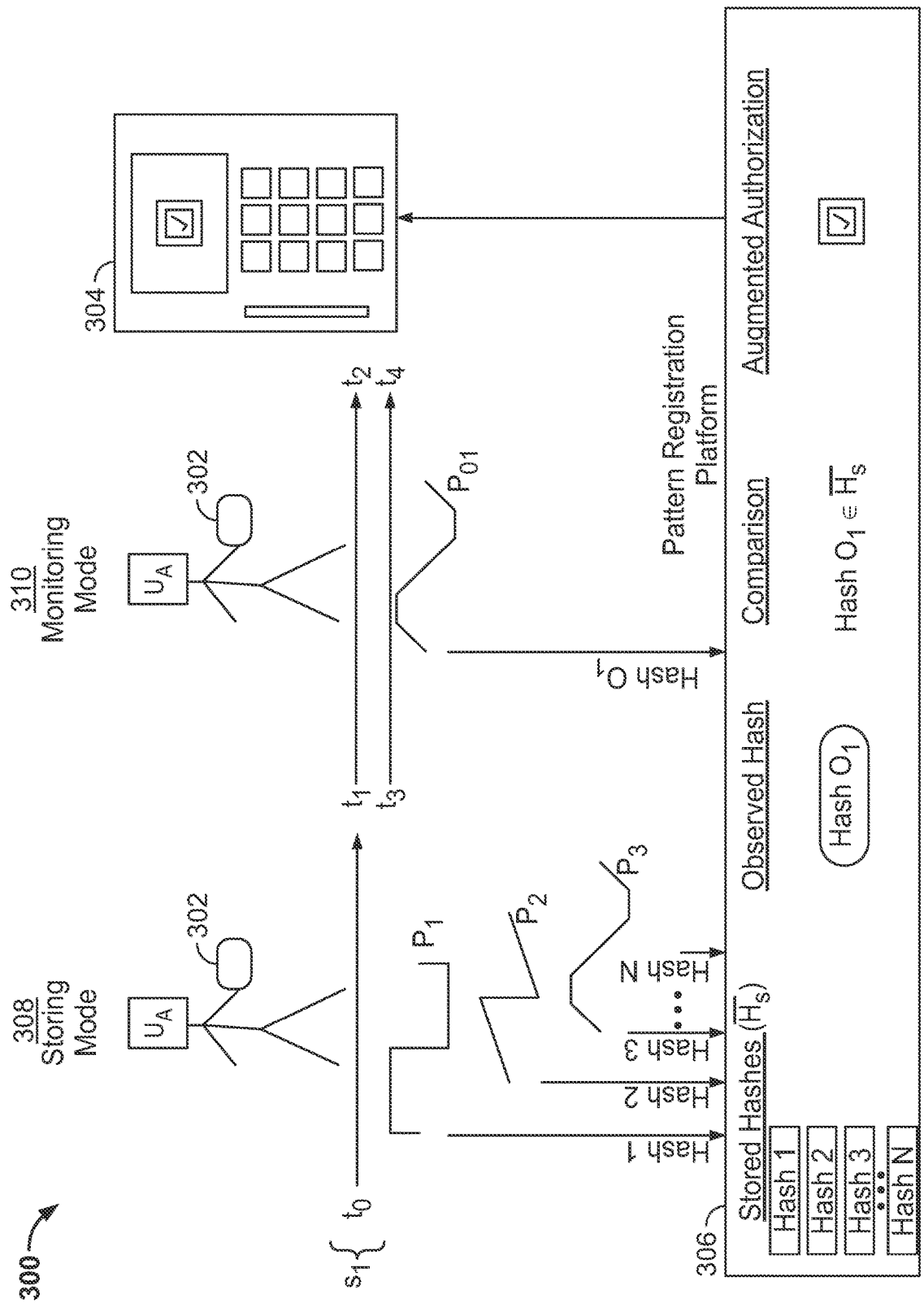
FIG. 4 shows an illustrative architecture in accordance with principles of the invention.

FIG. 4 shows architecture 300 as applied to scenario S1. Scenario S1 includes illustrative time periods t0-to1, t1-t2 and t3-t4. Period t0-t1 may correspond to storing mode 308. Periods t1-t2 and t3-t4 may correspond to monitoring mode 310. During all the periods, transaction instrument 302 is in the possession of authorized user UA.

During period t0-t1, user UA may perform a series of behaviors. Transaction instrument 302 may sense one or more patterns such as patterns P1, P2, P3, . . . , PN. Transaction instrument 302 may convert each of the patterns into a hash value, such as corresponding hash values hash 1, hash 2, hash 3, . . . , hash N. Transaction instrument 302 may communicate the N hash values to pattern registration platform 306. Pattern registration platform 306 may store the N hash values as an array HS of stored hash values.

User UA may set transaction instrument 302 to monitor mode 310. In one or both of periods t1-t2 or t3-t4, transaction instrument 302 may sense one or more patterns such as first observed pattern PO1. First observed pattern PO1 may be inherently linked to the identity of user UA, because it corresponds to the behavior of user UA.

Transaction instrument 302 may transmit to pattern registration platform 306 first observed hash value HO1, which may correspond to first observed pattern PO1. Pattern registration platform 306 may perform a comparison and recognize that first observed hash value HO1 is a member of array HS (HO1∈HS). Pattern registration platform 306 may thus grant to transaction device 304 augmented authorization.

Figure 5:
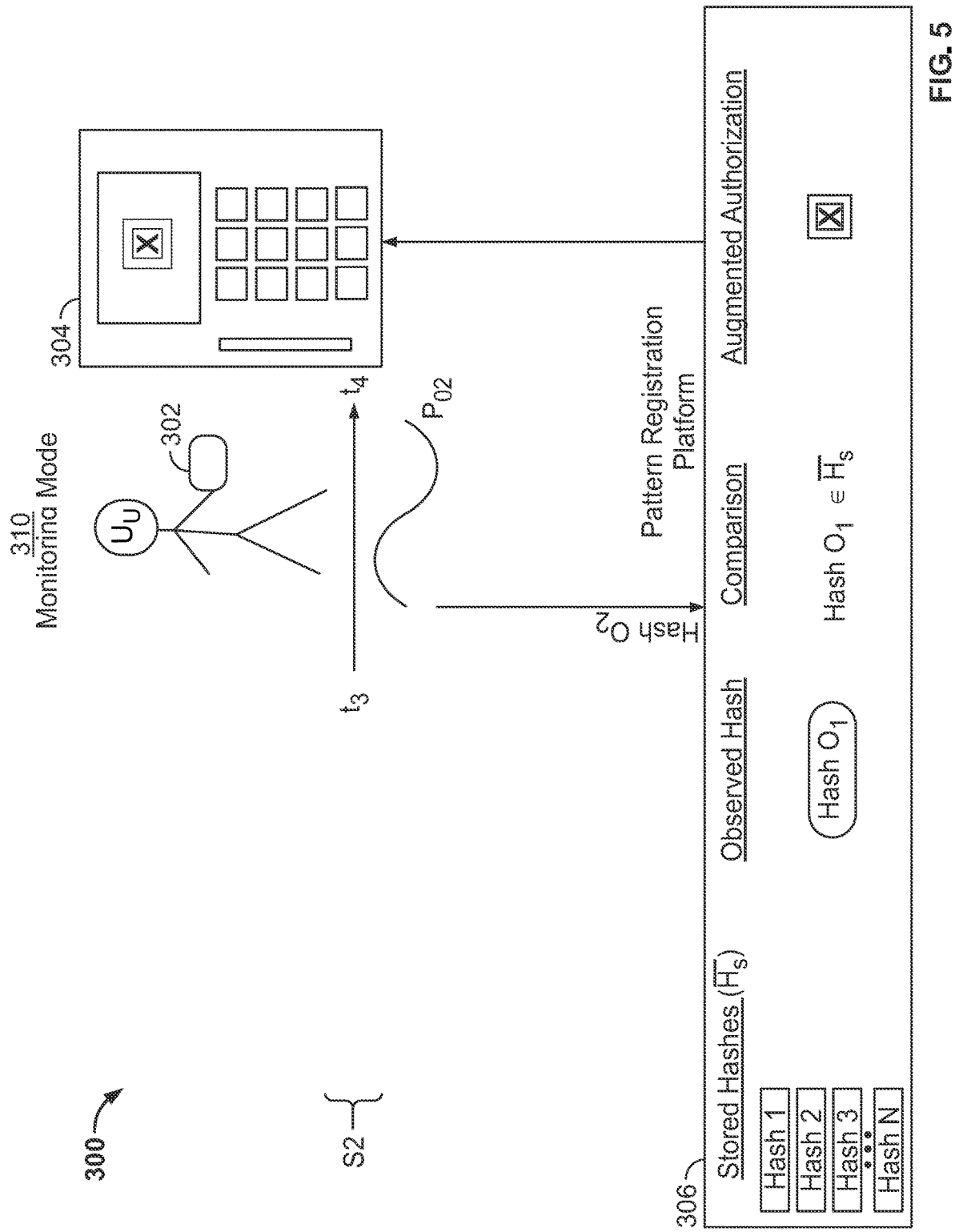
FIG. 5 shows an illustrative architecture in accordance with principles of the invention.

FIG. 5 shows architecture 300 as applied to scenario S2, in which during one or both of periods t1-t2 or t3-t4, unauthorized user UU gains possession of transaction instrument 302. In scenario S2, transaction instrument 302 may sense one or more patterns such as second observed pattern PO2. Second observed pattern PO2 may be inherently different from any pattern that is linked to the identity of user UA, because pattern PO2 corresponds to the behavior of user UU.

Transaction instrument 302 may transmit to pattern registration platform 306 second observed hash value HO2, which may correspond to second observed pattern PO2. Pattern registration platform 306 may perform a comparison and recognize that second observed hash value HO1 is not a member of array HS (HO2∉HS). Pattern registration platform 306 may thus deny to transaction device 304 augmented authorization.

Figure 6:
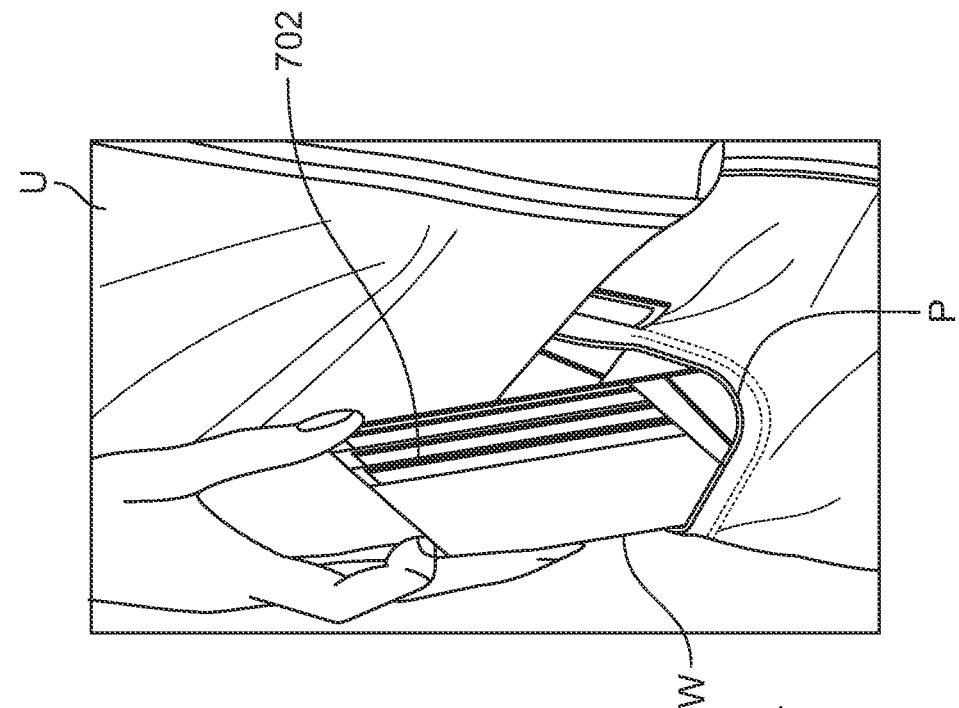
FIG. 6 shows illustrative apparatus in accordance with principles of the invention.

FIG. 6 shows illustrative transaction instrument 602. Transaction instrument 602 may have one or more features in common with transaction instrument 302. Transaction instrument 602 may include layer 606. Layer 606 may include elements of information, which may include transaction information, such as elements 608, 610 and 612. Transaction element 602 may include layer 614. Layer 614 may be exposed environmental elements. Layer 614 may include one or more photo diodes 616. Layer 614 may include one or more microprocessors 618. Layer 614 may include one or more sensors 620. Photo diodes 616 may collect light energy for powering a microprocessor. Photo diodes 616 may collect light energy for powering a sensor.

Figure 7:
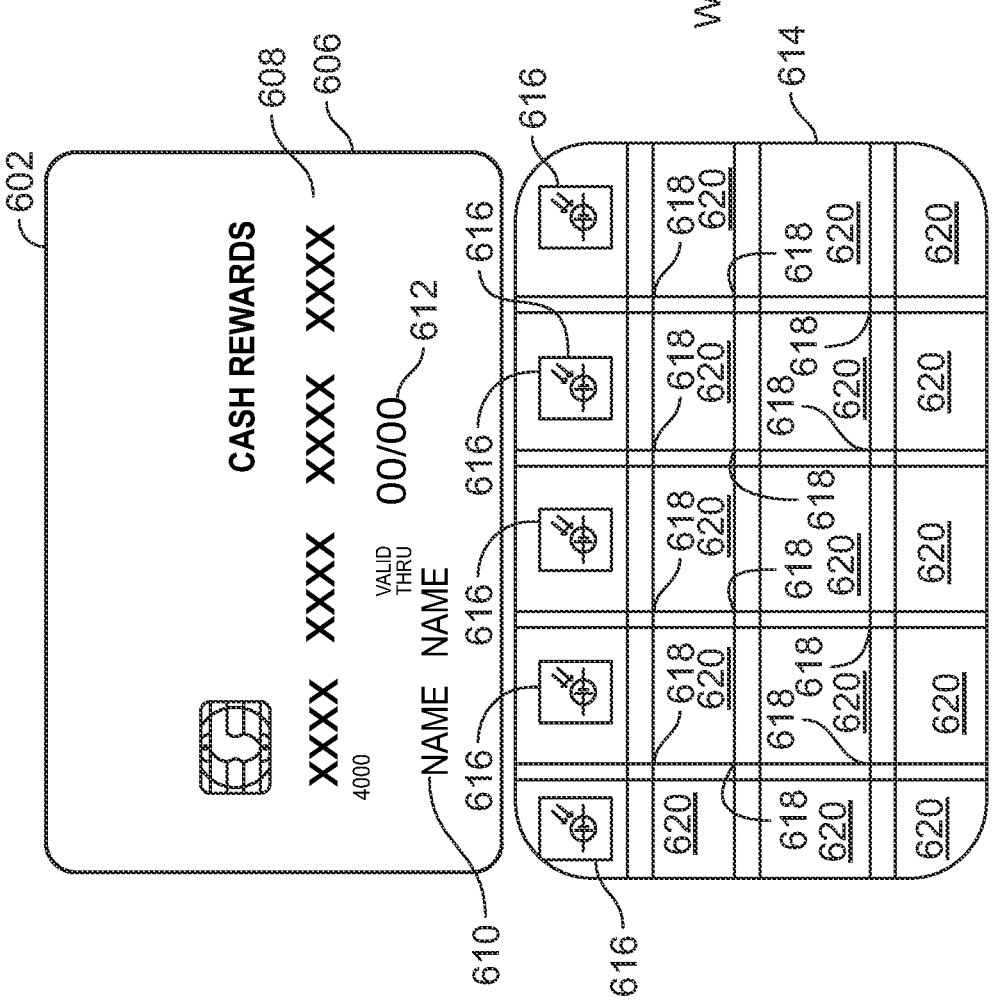
FIG. 7 shows illustrative apparatus in accordance with principles of the invention.

FIG. 7 shows user U with a transaction instrument 602 disposed in wallet W. Wallet W may be carried in pocket P of user U. When transaction instrument 602 is disposed in pocket P, sensors 620 may sense environmental parameters related to behaviors of user U.

Figure 8:
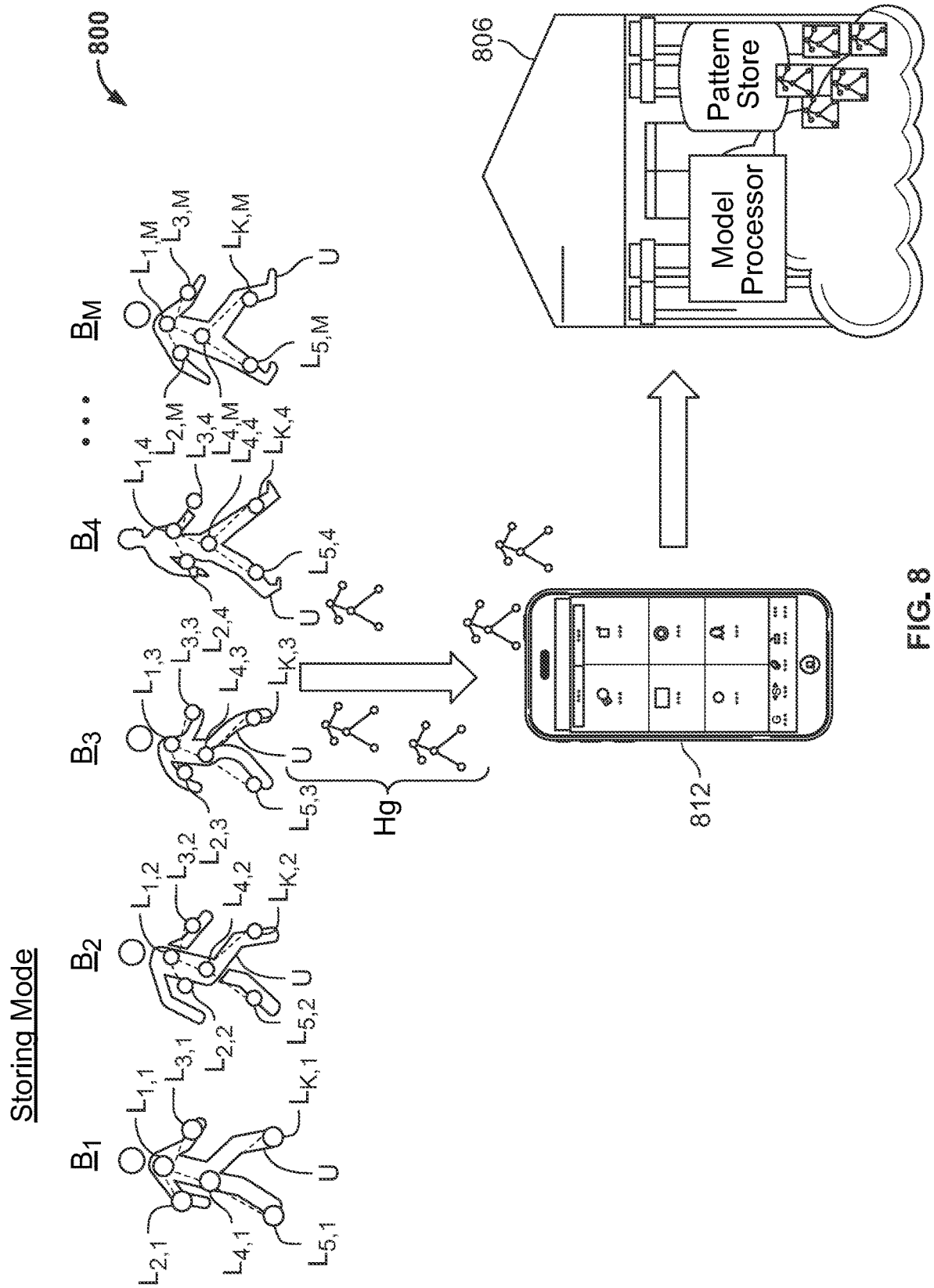
FIG. 8 shows illustrative information and apparatus in accordance with principles of the invention.

FIG. 8 shows illustrative storing mode 800. Storing mode 800 may have one or more features in common with storing mode 308. In storing mode 800, user U may engage in behaviors Bi, i=1 . . . N. For each behavior Bi, user U may dispose transaction instrument 602 in a location Lk, k=1 . . . K. Locations Lk may be predetermined. Locations Lk may be provided to user U by pattern registration platform 806, which may have one or more features in common with pattern registration platform 306.

A pattern may be defined based on a single behavior and a single location. A pattern may be defined based on a single behavior and multiple locations. A pattern may be defined based on multiple behaviors and a single location. A pattern may be defined based on a multiple behaviors and multiple locations.

For each pattern Pq, transaction instrument 602 may generate a hash value Hq. Hash values Hq may be transmitted to pattern registration platform 806.

Pattern registration platform 806 may include model processor 808. Pattern registration platform 806 may include pattern store 810. Pattern store 810 may store the hash value. Model processor 810 may invert a hash tag into a pattern data set. The pattern data set may include behavior components. Model processor 810 may perform comparisons between patterns.

Mobile terminal 812 may include a user interface for transaction instrument 602. Mobile terminal 812 may provide communication between transaction instrument 602 and pattern registration platform 806.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

For the sake of illustration, the steps of the illustrated processes may be described as being performed by a "system." A "system" may include one or more of the features of the apparatus and schemae that are shown in FIG. 1-8 and/or any other suitable device or approach. The "system" may include one or more means for performing one or more of the steps described herein.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative process may include steps shown in connection with another illustrative process.

Figure 9:
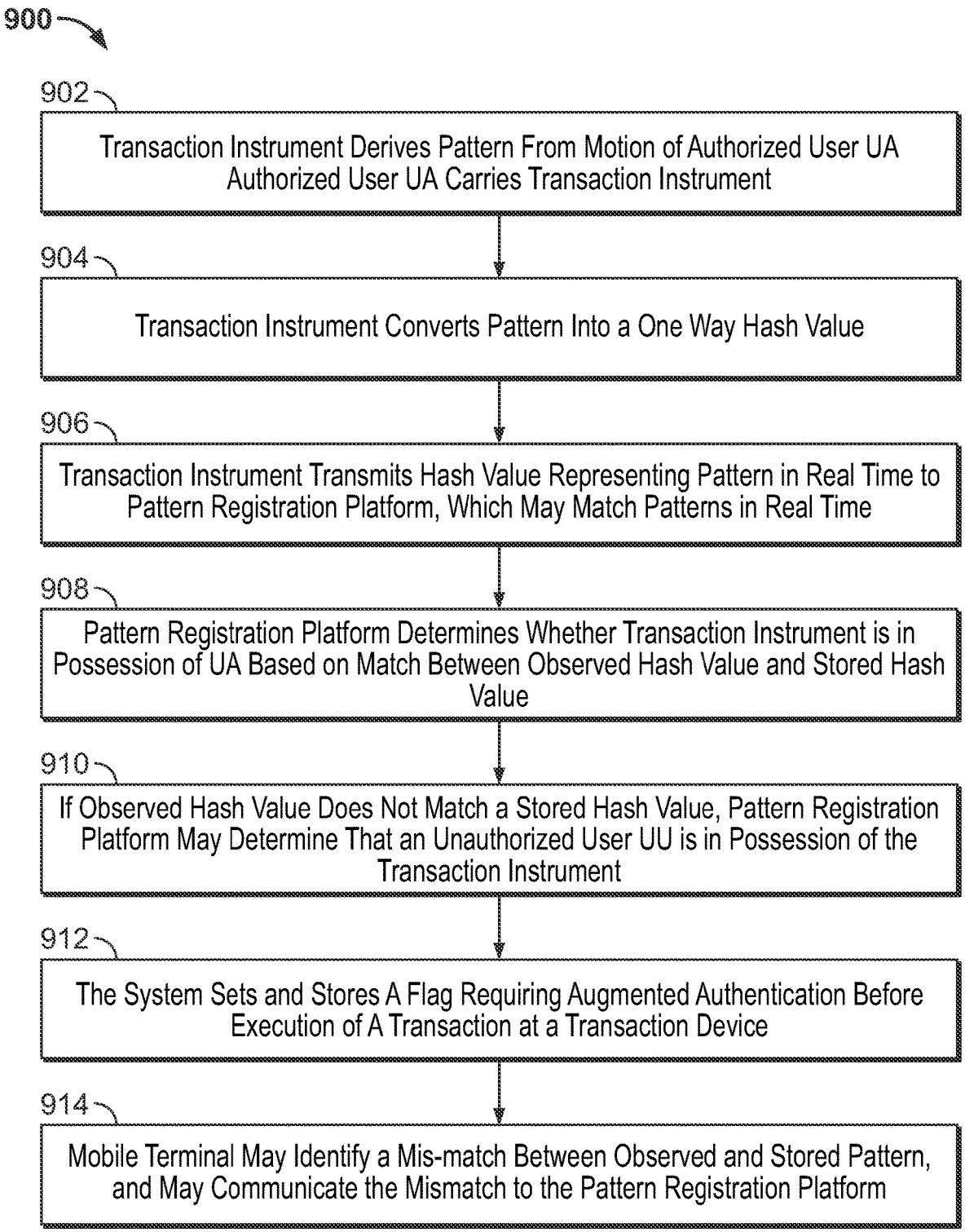
FIG. 9 shows illustrative steps of an illustrative process in accordance with principles of the invention.

FIG. 9 shows illustrative steps of illustrative process 900 for securing a transaction. At step 902, the transaction instrument may derive a pattern from motion of a user carrying the transaction instrument.

At step 904, the transaction instrument may convert the pattern into a one-way hash value.

At step 906, the transaction instrument transmits hash value representing pattern in real time to pattern registration platform, which may match patterns in real time At step 908, the pattern registration platform may determine whether the transaction instrument is in possession of the UA based on a match between an observed hash value and stored hash value.

At step 910, if an observed hash value does not match a stored hash value, the pattern registration platform may determine that an unauthorized user UU is in possession of the transaction instrument.

At step 912, the system may set and may store a flag requiring augmented authentication of a user before execution of a transaction using the transaction instrument at a transaction device.

At step 914, a mobile terminal may identify a mis-match between observed and stored pattern, and may communicate the mismatch to the pattern registration platform.

FIG. 10 shows, in connection with steps of process 900, observed and stored hash values corresponding to authorized user UA and unauthorized user UU, respectively.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods and apparatus for securing a transaction have been provided. Persons skilled in the art will appreciate that the present invention may be practiced by other than the described embodiments, which are presented for purposes of illustration rather than of limitation.

What is claimed is:

1. Apparatus for securing a transaction, the apparatus comprising a transaction card, the transaction card comprising:
   a first microprocessor configured to exchange transaction data to effect a transaction by engagement of the first microprocessor with a transacting party;
   a sensor configured to detect an environmental parameter, the parameter comprising a movement of the transaction card; and
   a second microprocessor in electrical communication with the sensor and configured to:
      derive a set of reference patterns during a series of activities comprising walking and working, each pattern based on (a) a transformation of a time series of signals output by the sensor, the transformation based on a relationship between the time series and a measurement of kinetic energy and (b) the disposition of the card at a location on a user body during the activity;
      convert each pattern in the set of reference patterns to a hash value using a one-way hashing algorithm;
      store the hash values corresponding to the reference patterns in an array of hash values;
      derive an observed pattern during an activity comprising walking or working, the pattern based on (a) a transformation of a time series of signals output by the sensor, the transformation based on a relationship between the time series and a measurement of kinetic energy and (b) the disposition of the card at a location on a user body during the activity, the activity completed prior to user arrival at a point of sale;
      determine whether a hash value computed from the observed pattern matches one of the hash values in the array; and
      based at least in part on the match, set a flag to be applied when the card is used for a transaction at a point of sale, the flag set prior to user arrival at a point of sale and requiring an augmented authentication, the augmented authentication comprising one or more actions not present in a basic authentication required for the transaction.

2. The apparatus of claim 1, wherein the second microprocessor is the first microprocessor.

3. The apparatus of claim 1, wherein the second microprocessor is configured to:
   validate the hash value computed from the observed pattern to the array of hash values;
   identify a mismatch between the hash value computed from the observed pattern to the array of hash values; and
   in response to the mismatch, initiate the augmented authentication.

4. The apparatus of claim 1, further comprising a pattern registration platform that is remote from the transaction card, the pattern registration platform configured to:
   validate the hash value computed from the observed pattern to the array of hash values;
   identify a mismatch between the hash value computed from the observed pattern to the array of hash values; and
   in response to the mismatch, initiate the augmented authentication.

5. The apparatus of claim 1, wherein:
the first microprocessor performs the transaction;
the second microprocessor derives a pattern; and
a transacting party communicates to the first microprocessor a request corresponding to the augmented authentication.

6. A method for securing a transaction, the method comprising:
communicating, from a pattern registration platform to a user, over the internet an instruction to perform an activity comprising walking or working;
sensing, on a transaction instrument configured to exchange transaction data to effect a transaction, an environmental parameter responsive to the activity, the parameter comprising a movement of the transaction instrument;
deriving a pattern from the movement detected by the sensor at a series of times and a position of the sensor at each time of the series of times;
computing an encrypted hash value from the pattern;
transmitting the hash value to the platform;
communicating, from the pattern registration platform to the user, over the internet, a supplemental instruction to perform a supplemental activity;
(a) sensing, on the transaction instrument, a supplemental environmental parameter responsive to the supplemental activity;
(b) deriving from the parameter a supplemental pattern;
(c) computing a supplemental encrypted hash value from the supplemental pattern; and
(d) transmitting the supplemental hash value to the platform;
repeating a-d until the platform comprises an array of hash values that includes the hash value and the supplemental hash values; and
based at least in part a match to a hash value in the array of hash values, setting a flag to be applied at a point-of-sale transaction, the flag set prior to user arrival at the point of sale and requiring an augmented authentication, the augmented authentication comprising the activity or the supplemental activity.

* * * * *